J. DAHL.
TRACTOR.
APPLICATION FILED NOV. 1, 1915.

1,235,014.

Patented July 31, 1917.
5 SHEETS—SHEET 1.

Witnesses
E. C. Skinkle
A. H. Opsahl

Inventor
John Dahl.
By his Attorneys

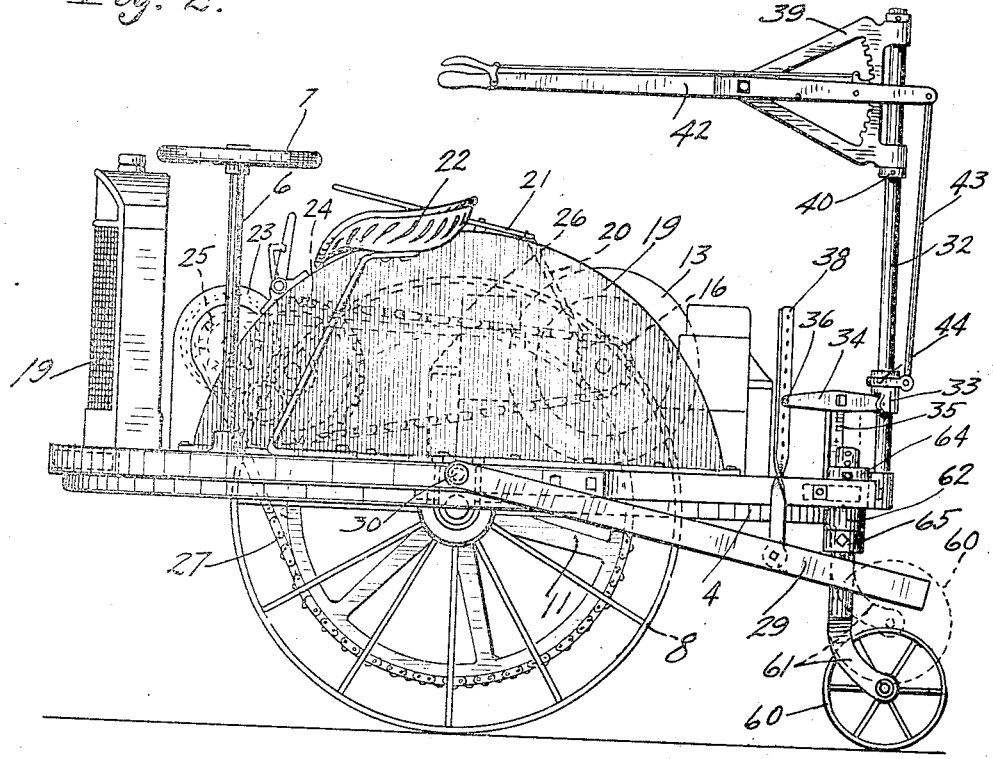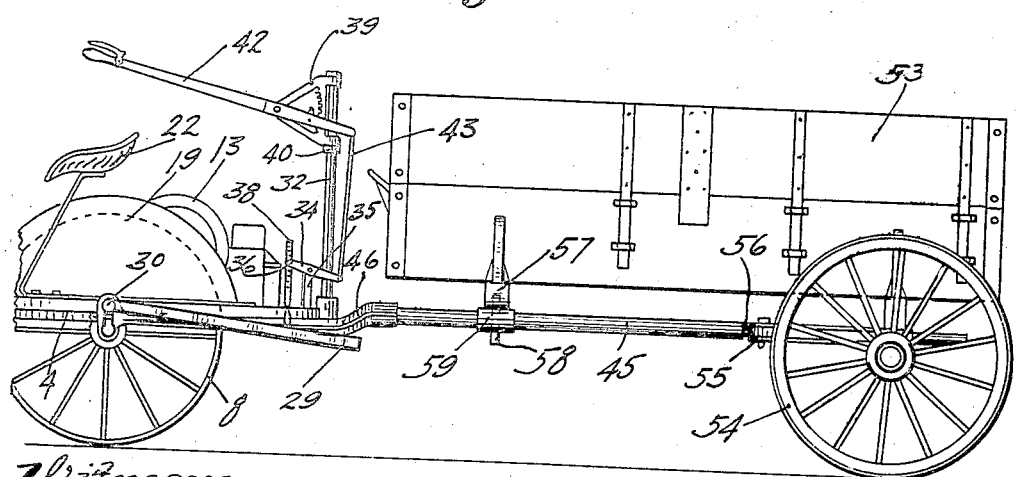

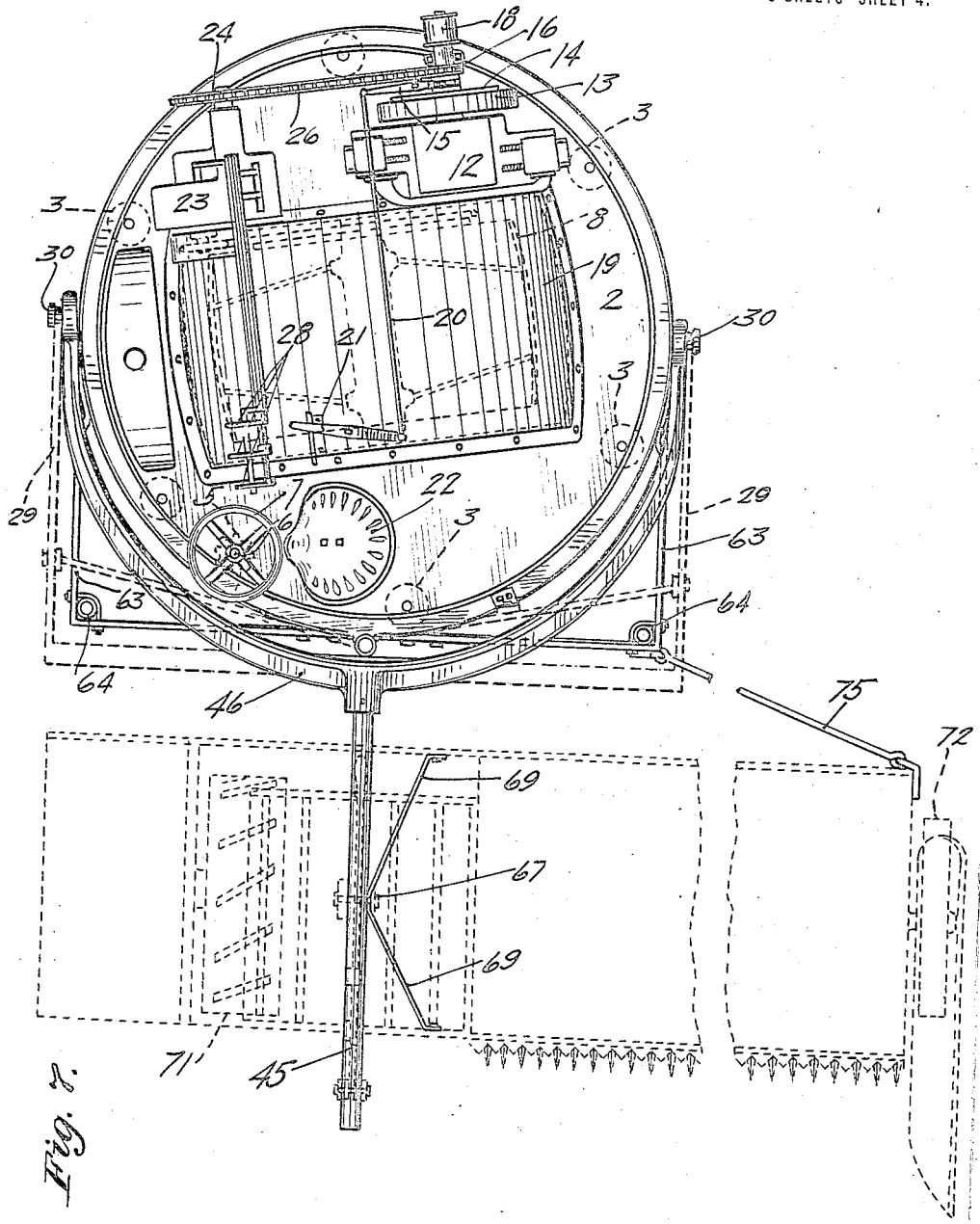

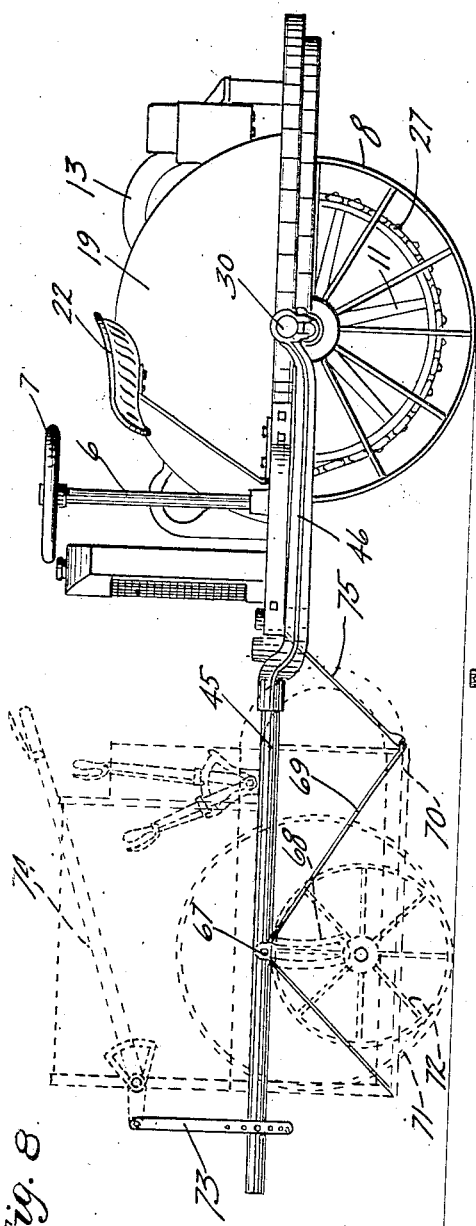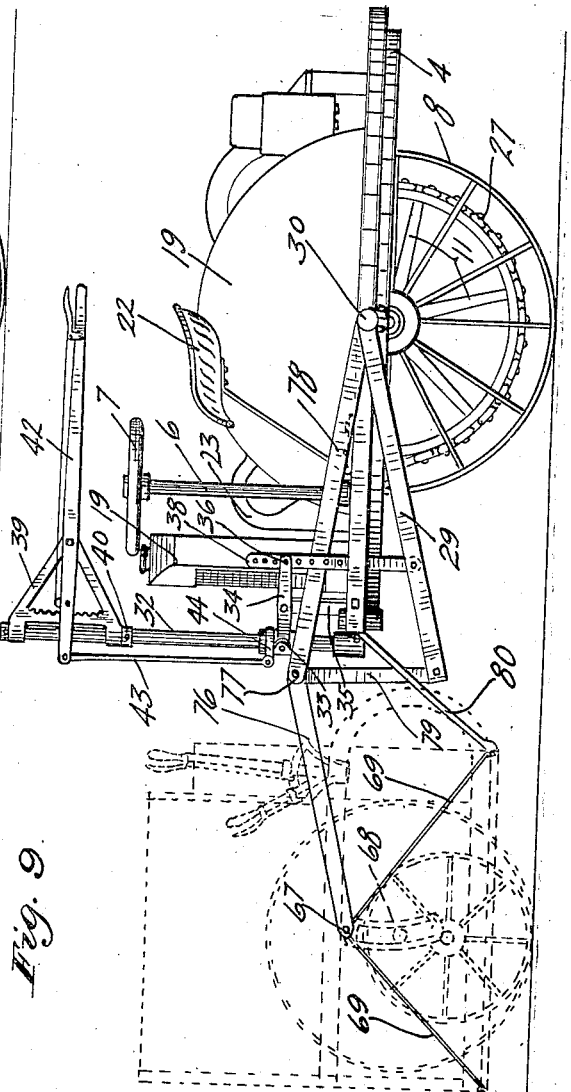

UNITED STATES PATENT OFFICE.

JOHN DAHL, OF GLENWOOD, MINNESOTA, ASSIGNOR OF ONE-HALF TO SAMUEL M. KUHNLEY, OF MINNEAPOLIS, MINNESOTA.

TRACTOR.

1,235,014.  Specification of Letters Patent.  Patented July 31, 1917.

Application filed November 1, 1915. Serial No. 59,072.

*To all whom it may concern:*

Be it known that I, JOHN DAHL, a citizen of the United States, residing at Glenwood, in the county of Pope and State of Minnesota, have invented certain new and useful Improvements in Tractors; and I do hereby declare the following to be a full, clear, and exact description of the invention, such as will enable others skilled in the art to which it appertains to make and use the same.

My invention has for its object to provide an extremely simple and highly efficient tractor especially adapted for connection to wagons, wheel plows, harvesters, seeders, cultivators, and various other vehicles or implements, and which, when thus connected, operates substantially as a one-wheeled tractor with all of the weight of the tractor proper on a single traction wheel. The tractor, however, is equipped with auxiliary wheels adapted to engage the ground and hold the tractor upright when the tractor is moved as an independent unit.

The tractor involves a so-called outer frame and a so-called inner frame, the latter being journaled within the former and capable of making an oscillation through at least 180 degrees, and preferably, through the entire 360 degrees. The motor, the driver's seat, the radiator, an explosive engine, and various other associated devices, such as an oil supply tank, transmission mechanism, steering controller, are all mounted on the pivoted inner frame, so that they partake of the horizontal oscillatory adjustments of the traction wheel. The outer frame is provided with a projecting coupling bar, so-called, which may operate either as a draw bar or as a push bar. This coupling bar is preferably pivoted to the outer frame, but means may be provided whereby, when desired, it may be secured to the outer frame against vertical adjustments. At its projecting portion, the coupling bar is provided with means whereby it may be readily attached to an independent vehicle or implement, such, for example, as those above enumerated. The invention also involves various other novel features, as will hereinafter more fully appear.

In the accompanying drawings which illustrate the invention, like characters indicate like parts throughout the several views.

Referring to the drawings:

Fig. 2 is a left side elevation of the tractor;

Fig. 6 is a side elevation with some parts broken away, showing the tractor coupled to a farm wagon, the front wheels of which are removed;

Fig. 7 shows the tractor coupled to a harvester in a manner to push the harvester ahead thereof, the harvester being diagrammatically indicated by dotted lines;

Fig. 8 is a side elevation of the parts shown in Fig. 7, the harvester being here also indicated by dotted lines; and Fig. 9 is a view corresponding to Fig. 8 but illustrating modified means for connecting the tractor to the harvester.

Figure 4:
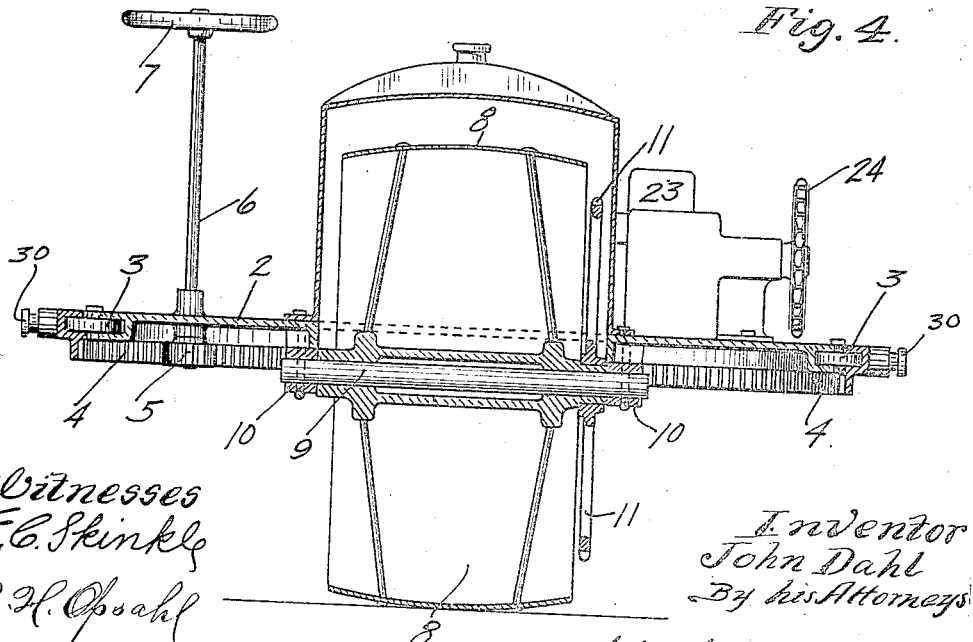
Fig. 4 is a transverse vertical section taken on the line $x^4$ $x^4$ of Fig. 1, some parts being removed.

The so-called outer frame 1 of the tractor is of annular form (see particularly Fig. 1) and the so-called inner frame 2 is in the form of a circular platform located within the said outer frame, and journaled thereto for rotation on a vertical axis, preferably by means of circumferentially spaced wheels 3 journaled to the said inner frame 2 and working in an internal annular groove formed in the said outer frame (see particularly Fig. 4). The annular outer frame 1 has an internal annular gear 4 that meshes with a small spur pinion 5 carried at the lower end of an upright steering post 6 journaled in a suitable bearing on the frame 2 and equipped at its upper end with a suitable hand piece in the form of a wheel 7.

The traction wheel 8 has a very wide faced rim which, for an important reason, is made concavo-convex in cross section, so that it has the greatest diameter at its central plane. This wheel is arranged to work in a larger opening formed in the central portion of the pivoted inner frame 2, and its hub is loosely journaled on an axle 9, the ends of which are fixed in suitable bearings 10 on the inner side of the inner frame 2. At one end, the hub of the said wheel carries a larger sprocket 11.

The motor preferably employed is a suitable explosive or internal combustion engine indicated as an entirety by the numeral 12. This engine is suitably mounted on the inner frame 2 at one side of the tractor wheel, and the engine crank shaft carries an internal clutch cone 13 that coöperates with a clutch cone 14 that is loose on the engine crank shaft and is adapted to be given lateral movements into and out of engagement with the clutch member 13, as shown, by means of a shipper lever 15 suitably pivoted to the inner frame 2. The hub of the clutch member 14 carries a small sprocket wheel 16 and the engine crank shaft extends through a bearing 17 on the inner frame 2 and is provided with a pulley 18 over which a belt, not shown, may be run when it is desired to utilize the power of the engine 12, while the tractor is stationary, for various purposes, such as for driving the various different kinds of stationary farm machinery.

The upper portion of the traction wheel 8 and certain of the parts are covered by a strong hood 19 secured on the inner frame 2. The clutch shipper lever 15 is connected by a cross rod 20 to a hand lever 21, shown as pivoted on the hood 19, and within reach of the operator's seat 22 which is supported by the inner frame or platform 2, as shown, at that side which is opposite to the side on which the engine is applied. Here it may be also noted that the said seat 2 is at such position that the hand wheel 7 of the steering post 6 may be easily reached therefrom.

Figure 1:
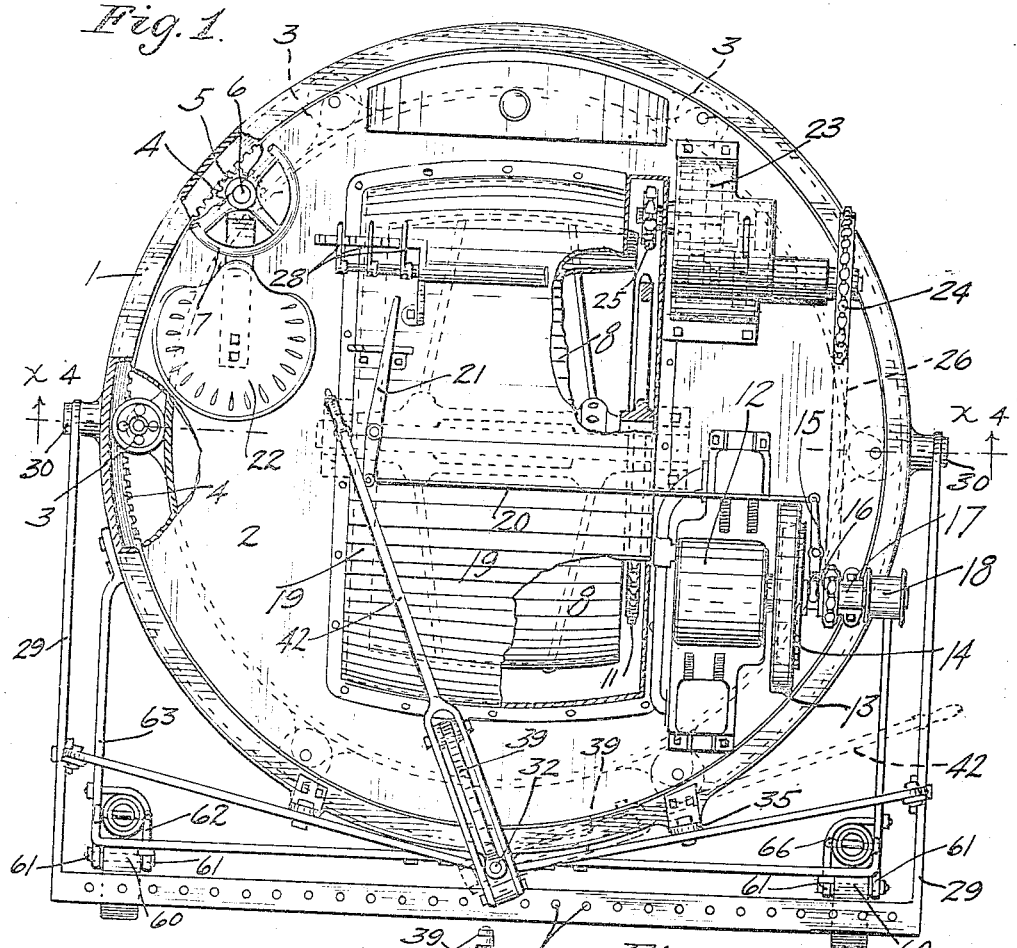
Figure 1 is a plan of the improved tractor with some parts broken away.

The engine 12 drives the traction wheel 8 through suitable transmission mechanism including some one or the other of the well known reversible variable speed transmission devices indicated by dotted lines in Figs. 1 and 2 and designated as an entirety by the numeral 23. For the purpose of this case, it is desirable to note only a driving sprocket 24 and a driving sprocket 25 of the said transmission mechanism, the said two sprockets 24 and 25 being alined, respectively, with the sprockets 16 and 11.

A sprocket chain 26 runs over the sprockets 16 and 24, and a sprocket chain 27 runs over the sprockets 25 and 11. Obviously, when the clutch cone 14 is thrown out of frictional contact with the clutch member 13, the power of the engine will not be transmitted to the traction wheel, but when the said cone members are engaged, the said traction wheel will be driven from the said engine. It may be here further noted, however, that the customary transmission controlling levers 28 (see Fig. 1) may be mounted on the hood 19 within convenient reach of the operator on the seat 22.

For the drawing of plows and certain other implements, the tractor is provided with a heavy bail-like, or approximately U-shaped coupling bar 29, the ends of the sides of which are pivotally connected to the sides of the outer frame 1, by suitable trunnions 30. The transverse portion of this coupling bar 29 is shown as formed with transversely spaced perforations 31 so that the plow or other implement may be attached to the said coupling bar at the proper point to give the desired draft and proper position of the plow or implement drawn. This coupling bar is arranged to be vertically adjusted and set in different positions by the following connections, which connections have already been referred to in a general way in the introductory part of this description.

Figure 3:
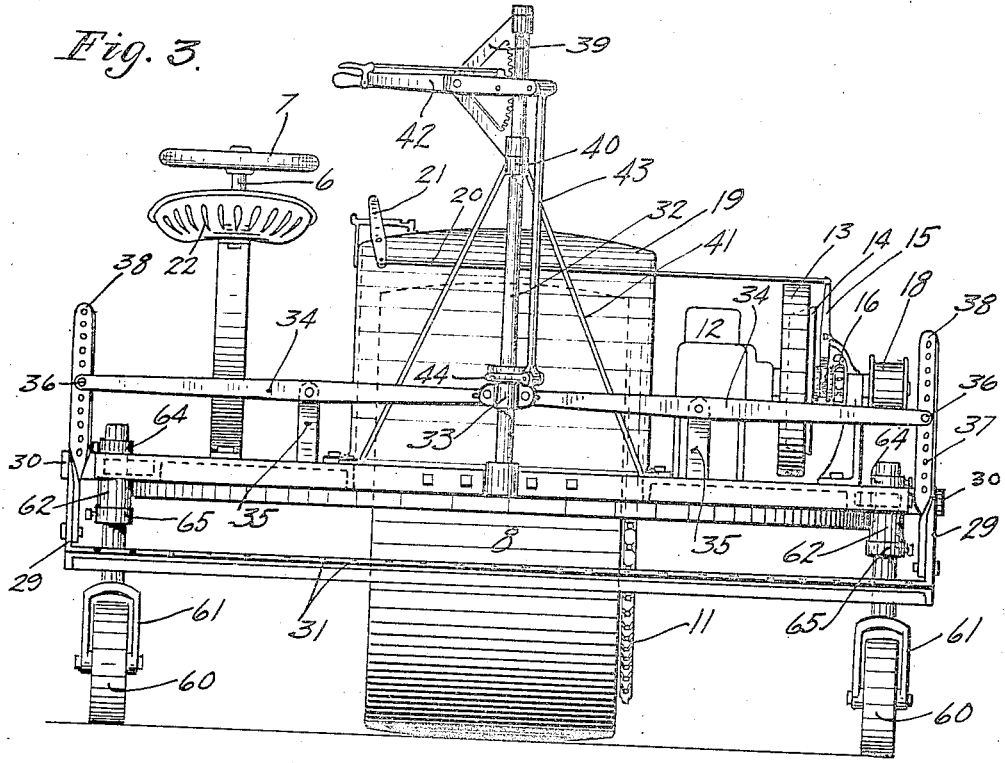
Fig. 3 is what may be treated as a rear elevation of the tractor.

For these parts, see particularly Figs. 1, 2 and 3, wherein the numeral 32 indicates an upright post rigidly secured to that portion of the outer frame 1 which is most closely adjacent to the transverse portion of the coupling bar 29. Mounted for vertical movements on this post 32 is a sleeve 33 pivotally connected to the inner ends of twin levers 34 that are intermediately pivoted to bearings 35 on the said frame 1. The outer ends of these levers 34 are adjustably connected, by suitable pins 36 and vertically spaced perforations 37, to upright metal straps 38, the lower ends of which are rigidly secured to the side portions of the said coupling bar 29. A latch sector 39 is swiveled on the upper end of the post 32 and, as shown, rests upon a collar 40 applied on the said post 32 and provided with braced legs 41 attached to the frame 1. A latch lever 42 is pivoted to the swiveled sector 39 and is adapted to be locked thereto in different positions, and, of course, partakes of the horizontal swinging movements of the said sector. This latch lever 42 is connected to the upper end of a link 43, the lower end of which is attached to a shipper ring 44 swiveled on the vertically movable sleeve 33. As is evident, by vertical adjustments of the lever 42, the coupling bar 29 may be vertically adjusted through the connections described. Here it may be also noted that the said latch lever may be swung laterally so as to be within reach of the operator's seat in all adjustments, to-wit, regardless of whether the tractor is adjusted for movement in a direction toward or from the coupling bar 29.

The coupling bar 29 is a relatively adjustable coupling bar, but for important reasons, I provide a second coupling bar which may be treated as a relatively fixed coupling bar, although it is preferably pivoted to the outer frame 1. This second or relatively fixed coupling bar preferably involves a projecting tubular portion 45 rigidly secured at its inner end to approximately semi-circular prongs 46, the ends of which prongs are pivotally attached to the sides of the outer frame 1, by the same trunnions 30 that serve to connect the sides of the coupling bar 29 to the said frame 1. In Figs. 1, 2 and 3, this second coupling bar is not shown as applied, and in fact, neither of the coupling bars is shown as applied in Fig. 4. It is, however, shown as properly applied in Figs. 5, 6, 7 and 8.

Figure 5:
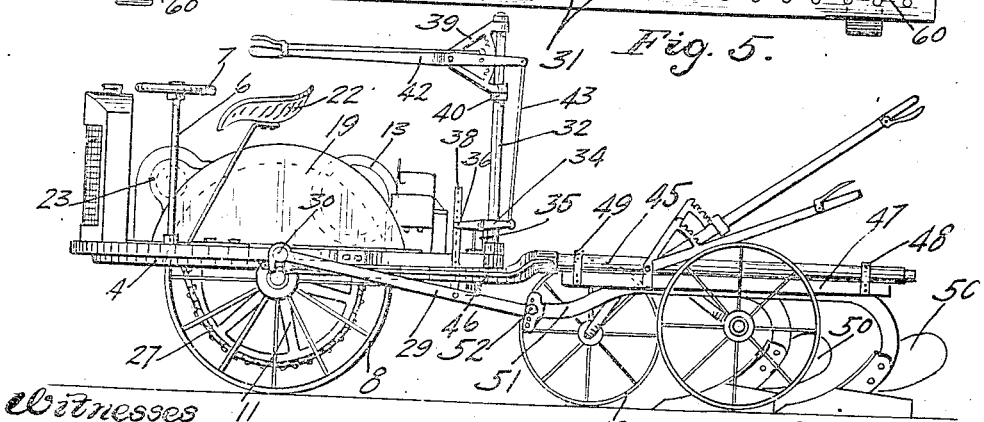
Fig. 5 is a side elevation showing the tractor coupled to a wheeled gang plow of well known construction.

For attaching the tractor to a wheeled plow, as shown in Fig. 5, the stem portion 45 of the relatively fixed coupling bar is attached to the frame 47 of the wheel plow, by means of one or more suitable clamps or coupling devices 48. The said wheeled plow further involves wheels 49 and plows 50 connected to a common plow beam 51. The plow beam 51 is connected to the transverse portion of the vertically adjustable coupling bar 29, by a suitable clevis or coupling pin 52. When the two coupling bars 29 and 45—46 are thus connected to the plow, the latter noted coupling bar will be relatively fixed, that is held against vertical movements while the coupling bar 29 may be vertically adjusted to regulate the depth of the furrow to be cut by the plows and also to cause the plows to work out of the soil or deeper into the soil. When thus used, both coupling bars operate as draw bars.

Fig. 6 illustrates the manner of connecting the tractor to a farm wagon, the front wheels of which have been removed. Of the parts of the wagon, the numeral 53 indicates the box, the numeral 54 the rear wheels and the numeral 55 the wagon hound having forwardly projecting reach 56. In this application of the tractor to a wagon, the tubular portion 45 of the relatively fixed coupling bar is telescoped over the wagon reach 56 and is rigidly secured to the front bolster 57 of the wagon box, by means of a coupling pin 58 passed through a reinforcing sleeve 59 on the said tubular stem 45. By a proper adjustment of the latch lever 42 the coupling bar 29 is forced upward against the forked portion 46 of the relatively fixed coupling bar, and there secured, as shown in Fig. 6, so that both of the coupling bars are then locked in respect to the outer frame 1. In this application, and also in the plow application of the tractor, the auxiliary wheels referred to in the introduction, are either adjusted into inoperative positions as shown by dotted lines in Fig. 2 or may be entirely removed.

The said auxiliary wheels 60 are journaled to caster brackets 61, the stems of which are normally swiveled in upright bearing sleeves 62 rigidly secured to the corner portions of horizontal angle brackets 63 bolted, riveted, or otherwise rigidly secured to the outer frame 1. The upright stem portions of the caster brackets 61 are provided with upper and lower collars 64 and 65 located, respectively, above and below the bearing sleeves 62. These collars are adjustably secured by suitable set screws so that the wheels and their caster brackets may be vertically adjusted. By passing pins or lock bolts 66 through coincident perforations in the sleeves 62 and stem of the caster bracket 61, the wheels 60 may be locked against horizontal oscillatory movements whenever desired.

Figs. 7 and 8 show the tractor applied to push the harvester ahead thereof, and in this connection of the tractor, the projecting stem portion 45 of the coupling bar 45—46 is connected by a bolt or pin 67 to the top of the bull wheel sector 68, and this bolt 67 also attaches to the said stem 45 an angular brace bar 69, the ends of which are suitably anchored to the front and rear portions of the harvester frame 70. The bull wheel and grain wheel of the harvester are indicated, respectively, by the numerals 71 and 72. The forwardly projecting portion of the stem portion 45 of the said coupling bar is connected by a link 73 to an arm of the customary tilting lever 74 of the said harvester. A brace bar 75 also preferably connects one corner of the frame bracket 63 to the rear of the frame of the harvester platform structure.

Fig. 9 shows a modified connection between the tractor and the harvester wherein a heavy link 76 is attached at its front end to the bull wheel sector 68 by the bolt 67, and the rear end of which is pivotally connected at 77 to two bars 78 and 79, the former of which is attached to one of the trunnions 30, and the latter of which is attached to the vertically adjustable coupling bar 29. The rear portion of the binder frame is also pivotally connected to the lower front end of a thrust bar 80, the rear upper end of which is rigidly attached to one corner of the angle bracket 63.

Attention is called to Fig. 7, wherein the traction wheel of the tractor is turned nearly at 90 degrees to the direction of projection of the coupling bars, so that the tractor and binder will be caused to turn approximately on the bull wheel of the harvester as a pivot. It, of course, therefore follows that with this arrangement, the tractor and harvester or other vehicle or implement pushed or drawn thereby may be caused to make very abrupt turns. Also, it is evident that the entire wheel or tractor proper is carried on the single traction wheel, thereby giving the greatest possible traction with a minimum tractor weight.

The transversely rounded face on the traction wheel is important for several reasons. In the first place, when running on hard road, it will be only at or near its transverse central portion so that the wheel may be easily swung, but when running on soft ground, it will sink until its entire face surface has contact with the ground. Inasmuch as the wheel is pivoted for oscillatory movement in the vertical plane of its greatest diameter, it will, when oscillating, swing on the very lowermost rounded portions of its face and this makes steering under all conditions much easier than with a wide faced wheel of any other form.

What I claim is:

1. In a tractor, the combination with a truck frame having a centrally located traction wheel carrying the main wheel of the load and mounted for horizontal oscillatory steering movements, an independent vehicle or implement, and coupling means connecting said tractor frame to the said independent implement or vehicle, the said coupling means holding said tractor frame and traction wheel in working position and rendering the said traction wheel available for driving a combined rig.

2. In a tractor, the combination with a truck frame having a centrally located traction wheel carrying the main weight of the load, laterally spaced auxiliary wheels applied to said frame at points offset from the axis of said traction wheel in a direction longitudinally of the tractor, said auxiliary wheels being adjustable to and from operative positions, a coupling bar connected to said tractor frame and partaking of the horizontal and transverse oscillatory movements thereof, and an independent vehicle or implement to which said coupling bar is rigidly connected, substantially as described.

3. In a tractor, the combination with a truck frame having a centrally located traction wheel carrying the main weight of the load, laterally spaced auxiliary wheels applied to said frame at points offset from the axis of said traction wheel in a direction longitudinally of the tractor, said auxiliary wheels being adjustable to and from operative positions, a coupling bar connected to said tractor frame and partaking of the horizontal and transverse oscillatory movements thereof, an independent vehicle or implement to which said coupling bar is rigidly connected, and a vertically adjustable connection between said coupling bar and tractor frame for imparting an angular vertical adjustment to one in respect to the other, substantially as described.

4. In a tractor, the combination with an outer frame and inner frame journaled therein for movement on a vertical axis, of a traction wheel journaled to said pivoted inner frame, a motor carried by said inner frame and having connections for driving said traction wheel, a coupling bar pivoted to said outer frame for vertical movements in respect thereto, a post on said outer frame, a lower lever pivotally supported by said outer frame and connected to said coupling bar for vertically adjusting the same, a latch lever mounted on said post for horizontal swinging movements, and having connections whereby its vertical movements operate the said latch lever, and, through the same, vertically adjust said coupling bar.

5. In a tractor, the combination with an outer frame and inner frame journaled therein for movement on a vertical axis, of a traction wheel journaled to said pivoted inner frame, a motor carried by said inner frame and having connections for driving said traction wheel, a coupling bar pivoted to said outer frame for vertical movements in respect thereto, a post on said outer frame, a lower lever pivotally supported by said outer frame and connected to said coupling bar for vertically adjusting the same, a latch lever mounted on said post for horizontal swinging movements and having connections whereby its vertical movements operate the said latch lever, and through the same, vertically adjust said coupling bar, and an operator's seat on the said inner frame at one side of said traction wheel, the said inner frame being capable of horizontal rotation through at least 180 degrees, and the horizontal movements of said latch lever permitting the same to be reached from the said seat for all adjustments of the said inner frame.

6. In a tractor, the combination with an outer frame and an inner frame journaled therein for movements on a vertical axis, of a traction wheel journaled to said pivoted inner frame, a motor carried by said inner frame and having connections for driving said traction wheel, a coupling bar applied to said outer frame and having means for detachably connecting the same to an independent vehicle or implement, auxiliary laterally spaced side wheels applied to said outer frame and mounted to operate normally as caster wheels, and means for locking said auxiliary wheels against horizontal angular movements in respect to said main frame.

7. In a tractor, the combination with an outer frame and an inner frame journaled therein for movements on a vertical axis, of a traction wheel journaled to said pivoted inner frame, a motor carried by said inner frame and having connections for driving said traction wheel, a coupling bar applied to said outer frame and having means for detachably connecting the same to an independent vehicle or implement, auxiliary laterally spaced side wheels applied to said outer frame and mounted to operate normally as caster wheels, means for locking said auxiliary wheels against horizontal angular movements in respect to said main frame, and means for vertically adjusting the said auxiliary wheels.

In testimony whereof I affix my signature in presence of two witnesses.

JOHN DAHL.

Witnesses:
 BERNICE G. WHEELER,
 HARRY D. KILGORE.